United States Patent
Wolf et al.

(10) Patent No.: US 7,414,965 B2
(45) Date of Patent: Aug. 19, 2008

(54) HITLESS PROTECTION SWITCHING

(75) Inventors: Michael Joachim Wolf, Mundelsheim (DE); Werner Beisel, Ludwigsburg (DE)

(73) Assignee: Alcatel, Paris (FR)

( * ) Notice: Subject to any disclaimer, the term of this patent is extended or adjusted under 35 U.S.C. 154(b) by 830 days.

(21) Appl. No.: 10/815,723

(22) Filed: Apr. 2, 2004

(65) Prior Publication Data

US 2005/0144504 A1   Jun. 30, 2005

(30) Foreign Application Priority Data

Apr. 11, 2003   (EP)   ................... 03290911

(51) Int. Cl.
*G01R 31/08* (2006.01)
(52) U.S. Cl. ..................... 370/216; 340/3.43
(58) Field of Classification Search ................ 370/216, 370/217, 218; 340/3.43, 3.44
See application file for complete search history.

(56) References Cited

U.S. PATENT DOCUMENTS

| | | | | |
|---|---|---|---|---|
| 4,528,662 A | * | 7/1985 | Floyd et al. | ................ 370/216 |
| 4,596,014 A | * | 6/1986 | Holeman | .................... 714/805 |
| 5,119,380 A | * | 6/1992 | Ohwada et al. | ............. 714/812 |
| 5,285,441 A | * | 2/1994 | Bansal et al. | ................ 370/218 |
| 5,631,896 A | * | 5/1997 | Kawase et al. | ............. 370/228 |
| 6,009,075 A | * | 12/1999 | Roberts et al. | ............. 370/219 |
| 6,079,045 A | * | 6/2000 | Van Den Enden | ........... 714/780 |
| 7,167,442 B2 | * | 1/2007 | Courtney et al. | ............ 370/217 |
| 2002/0126704 A1 | * | 9/2002 | Cam et al. | ................... 370/503 |

FOREIGN PATENT DOCUMENTS

| | | |
|---|---|---|
| DE | 39 29 793 A1 | 3/1991 |
| DE | 42 38 410 A1 | 5/1994 |
| EP | 0 696 111 A2 | 2/1996 |
| EP | 1 261 157 A2 | 11/2002 |

* cited by examiner

*Primary Examiner*—Hassan Kizou
*Assistant Examiner*—Bo Hui A Zhu
(74) *Attorney, Agent, or Firm*—Sughrue Mion, PLLC

(57) ABSTRACT

A network element with equipment protection has first and second redundant signal paths for first and second redundant signals; a selector for selecting either of the two redundant signals as active; and first and second transition monitors coupled to the first and second signal paths, respectively, for monitoring the first and second signals for bit level transitions. The selector is controlled by the transition monitors to alter selection in the case that the selected signal does not contain bit level transitions while the non-selected signal does.

6 Claims, 2 Drawing Sheets

HITLESS PROTECTION SWITCHING

The invention is based on a priority application EP 03290911.1 which is hereby incorporated by reference.

FIELD OF THE INVENTION

The present invention relates to the field of telecommunication and more particularly to a method and corresponding apparatus for switching in a telecommunications equipment between an active and a redundant signal in a hitless manner, i.e., without corrupting data transmitted by the active and redundant signal.

BACKGROUND OF THE INVENTION

In telecommunications networks, reliability and failure resistance is a primary issue and telecommunications equipment shall ensure continued operation even in the case any equipment component fails. Therefore, network elements are provided with equipment protection, which means that core components are provided twice so that a redundant system component can take over operation of a failed system component.

Typical network elements of a transmission network such as crossconnects and add/drop multiplexers have a switching matrix for randomly connecting signals from any input to any output. This switching matrix (referred to as copy A) is typically protected by a redundant second matrix (referred to as copy B).

The principle of equipment protection is that all signals are duplicated and distributed to the active and the redundant standby equipment component, which both perform the identical operation on the signal. On the output side, the two signals are combined again by selecting the better of the two for further processing. So, if the active component fails, the signal processed by the standby component is selected and the standby component thus becomes active.

However, loss of signal detection may take some time, during which a bit error burst is transmitted before the protection switch is activated. This situation results in a "hit" in the output signal and it is thus desirable to perform hitless protection switching, i.e., to switch from active to standby signal before a disruption in the active signal may reach the output.

Known hitless protection switch systems have a large buffer for synchronization of the data signals. This buffer allows to base the loss of signal detection on a loss of frame event. Known failure detectors therefore need a long time (expressed in bit periods) to detect a failure condition and switch from active to standby signal. Moreover, a large buffer impacts the signal delay performance during normal operation and involves higher equipment cost and higher power dissipation.

It is thus an object of the present invention to provide a hitless equipment protection system and method that does not require large buffers.

European patent application EP 0 696 111 A2 describes a hitless path switching apparatus where the working and protection paths are continuously monitored for bit errors. If a bit error occurs in the working path and no bit error occurs in the protection path, switching from the working to the protection path is performed on data block basis.

European patent application EP 1 261 157 A2 describes hitless protection switching in a transmission system supporting virtual concatenation. The described apparatus receives data signals on at least two transmission paths and outputs data from a selected one of these paths. The received data signals are aligned first so that the selector mechanism can select between corresponding elements of the received data signals. This allows hitless switching to be performed since there is no loss or repetition of signal elements when switching occurs.

German patent application DE 42 38 410 A1 describes a communication and control system in a base station of a cellular network. All modules of the base station communicate over a common bus system. Two redundant bus systems are provided and all data communicated in parallel over both of them. Check bits are evaluated to select only valid data from the two busses.

German patent application DE 39 29 793 A1 describes duplex communication over redundant communication paths. In receive direction, the paths are monitored for the presence of a carrier signal. When no modulated carrier signal is received on the selected path, a modulated carrier is sent in reverse direction step by step on all paths. When a carrier signal is detected on one of the paths, this one is selected as active path.

SUMMARY OF THE INVENTION

These and other objects that appear below are achieved by detecting signal transition in both copies of a protected signal and by switching from the active copy to the standby copy if the former does not show any signal transition any more but the latter does.

In particular, a network element according to the present invention has first and second redundant signal paths for first and second redundant signals; a selector for selecting either of the two redundant signals as active; and first and second transition monitors coupled to the first and second signal paths, respectively, for monitoring the first and second signals for bit level transitions.

The selector is controlled by the transition monitors to alter selection in the case that the selected signal does not contain bit level transitions while the non-selected signal does.

The invention allows immediate detection of a failure condition and to switch over in a hitless manner at the time of detection of a failure. This greatly facilitates maintenance because there is no need anymore to initiate the protection switch earlier in time in order to avoid a traffic hit.

BRIEF DESCRIPTION OF THE DRAWINGS

Preferred embodiments of the present invention will now be described with reference to the accompanying drawings in which.

DETAILED DESCRIPTION OF THE INVENTION

Network elements typically have equipment protection installed, which means that certain core processing units such as for example a switch matrix is provided in duplicate so that the second redundant processing units can take over operation if the first active processing unit fails. Internally, the network element has thus two redundant signal paths, one leading over active matrix copy A and one over redundant matrix copy B. The signal that is protected that way, is copied to either of the two signal paths, so that the paths carry identical signals. At the output side, however, the better of the two signals is selected for output. As explained above, in today's network elements the switch-over from active to redundant signal path is either not hitless or requires a large frame buffer.

Figure 1:
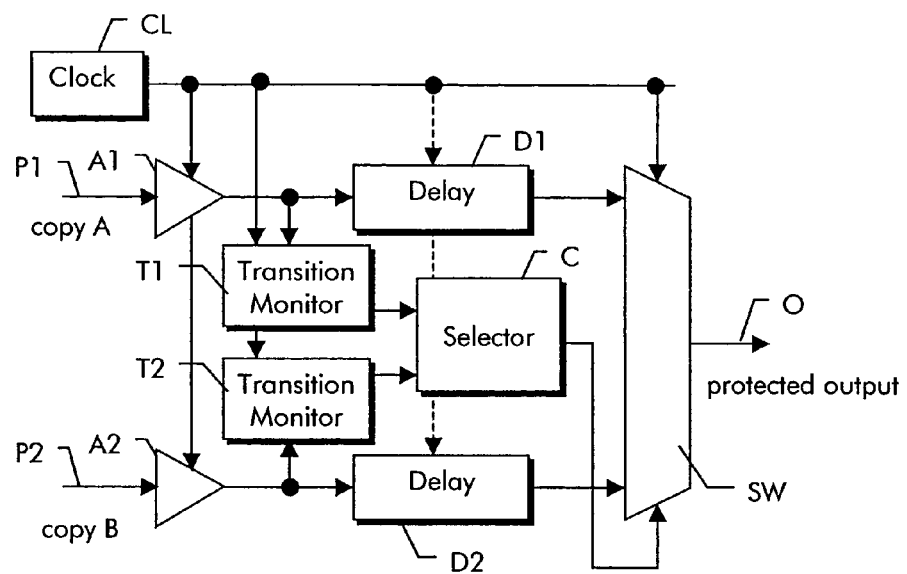
FIG. 1 shows a block diagram of a network element.

The components in a network element that are involved in the selection according to the invention are shown in a first embodiment in FIG. 1. The network element has an equipment clock CL, two redundant signal paths P1, P2 and a switch SW selecting one of the two for output O. Each signal path is fed to an amplifier A1, A2, respectively clocked by clock CL, which leads to a delay line D1, D2. The amplified signal is also fed to a transition monitor T1, T2. The output of the transition monitor is coupled to a selector C, which controls the operation of the switch SW.

The working principle of the circuit according to the invention is simple: Transition monitors T1, T2 are provided on each data signal copy P1, P2. All the circuits are synchronously clocked by the system clock CL and the data signal copies are frame aligned. The copy which does not show any transition on a sliding block of N bits is assumed to be faulty. Between the monitor T1, T2 and the hitless switch SW there are delay elements D1, D2 in the data signal stream with transmission delay equivalent to N bits at least. N bit period is the time needed to detect a loss of signal condition and operate the hitless switch.

The delay line can be implemented by a simple shift register of N bit depth clocked by the system clock or by any other delaying component, including for example a FIFO (first-in-first-out buffer) or a cable or wave guide delay line with appropriate length so that the total propagation delay equals N bits. The amplifiers A1, A2 are optional and may be discarded if not needed.

The transition monitors are clocked by system clock CL and detect bit level transitions, i.e., whether the signal level changes from high to low or vice versa from one clock pulse to the next. If no such bit level transitions occur in the input signal, the latter is assumed to be faulty. If at the same time, the other signal shows transitions, the selector C triggers a switch-over from the alleged faulty signal to the one still showing transitions, provided that the former was selected before.

The signal copies are selected according to table 1 below:

TABLE 1

Selection criteria for copy A/B

| History | copy A | copy B | select copy |
|---------|--------|--------|-------------|
| A | OK | OK | A |
| B | OK | OK | B |
| A | NOK | OK | B |
| B | NOK | OK | B |
| A | OK | NOK | A |
| B | OK | NOK | A |
| A | NOK | NOK | A |
| B | NOK | NOK | B |

If for example signal copy A was selected and signal copies A and B show transitions and are thus assumed to be all right, then signal copy A remains selected (line 1). If signal copy A was selected and A is found to be faulty (NOK) but B appears to be all right, selection will be reverted from signal A to signal B (line 3). However, if both signal copies are found to be faulty, then no switch-over is initiated (lines 7 and 8).

If the data signal consists of a long sequence of identical digits then the both transition monitors qualify either copy as being NOK, but according to the table above no copy switch is initiated. However, if in such case copy A fails there may be a transition to the low level which would initiate a switch over to the failed copy. In order to avoid this, the signal state can be used in this particular situation as an additional criterion. Thus if both signals do not shows transients, a copy is OK if the signal state is "active" otherwise it is NOK.

In the first embodiment, however, a problem may occur if the failed copy of the data signal toggles between two signal states. In this case, the proposed mechanism will fail. Thus, in a second improved embodiment, the selection is made more robust against such failure by allowing transition based selection only if the data signal itself is found to be valid, e.g., by presence of a frame pattern. A second monitor is therefore added, which searches for significant signal parts in the signals and enables transition-based selection only, if such significant signal part is found. This second criterion is given the higher priority.

Figure 2:
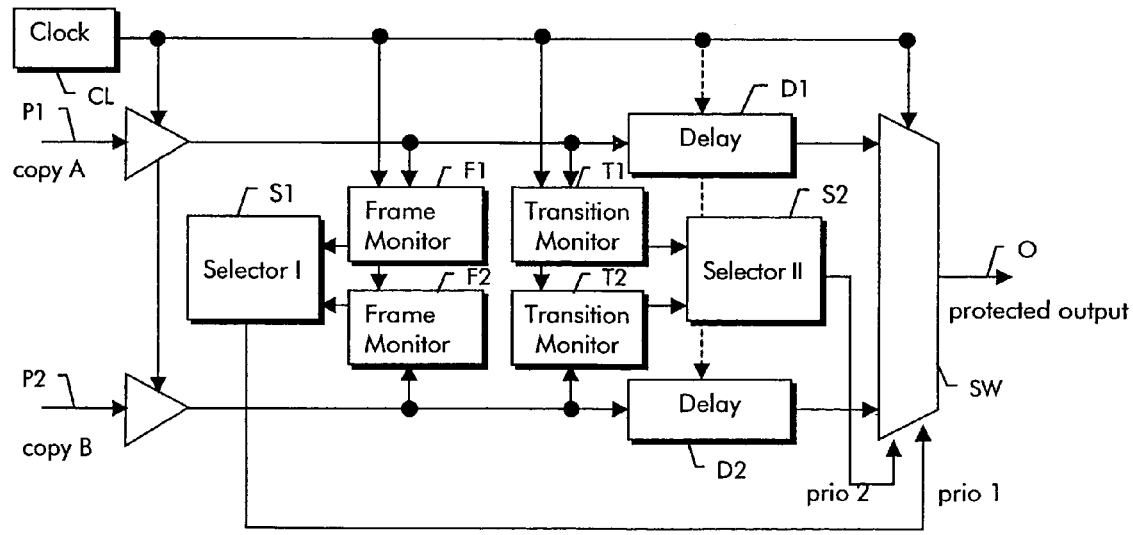
FIG. 2 shows a block diagram of a second embodiment of a network element according to the invention.

The circuit according to the second embodiment is shown in FIG. 2. It contains all circuit components from FIG. 1 and in addition first and second frame monitors F1, F2 linked to the first and second signal paths P1, P2, respectively. The two frame monitors lead to a first selector S1, which controls the switch SW with first priority, i.e., only if a signal is found to be valid, it can be selected for output. The transition monitors T1, T2 lead to a second selector S2, which controls the switch SW in the way described above, but with the above restriction that switch-over is only enabled if the selected signal is found to be valid by the corresponding frame monitor. If the first selector finds one signal valid and the other invalid, it switched to the valid one, irrespective what the second selector results. The second selector S2 has thus a second priority lower than the first priority of the first selector S1.

The selection criteria for a priority 1 selection based on significant signal parts (e.g. framing) is shown in table 2 below.

TABLE 2

Priority 1 selection criteria using frame monitor

| History | copy A | copy B | selection |
|---------|--------|--------|-----------|
| A | OK | OK | Allow for prio 2 selection |
| B | OK | OK | Allow for prio 2 selection |
| A | NOK | OK | B |
| B | NOK | OK | B |
| A | OK | NOK | A |
| B | OK | NOK | A |
| A | NOK | NOK | A |
| B | NOK | NOK | B |

Only if both signal copies appear to be valid by the frame monitor, priority 2 selection based on the transition monitors is enabled according to table 3 below.

TABLE 3

Priority 2 selection criteria using transition monitor

| History | copy A | copy B | select copy |
|---------|--------|--------|-------------|
| A | OK | OK | A |
| B | OK | OK | B |
| A | NOK | OK | B |
| B | NOK | OK | B |
| A | OK | NOK | A |
| B | OK | NOK | A |
| A | NOK | NOK | A |
| B | NOK | NOK | B |

However, toggling of a failed signal can normally also be avoided by the use of suitable pull-down or pull-up circuits at preceding data signal driver output or receiver input circuits.

When one data signal breaks, a hit in the failed signal may occur, which causes an extra transition, e.g. from high level to low level. Such a hit should not cause the system to switch to the failed signal. In another preferred improvement of the invention, a timer is thus provided and switch-over is only initiated if the failure condition in the currently selected signal persists after a timeout. This improvement makes the selection also robust against some signal toggling before the loss condition is reached.

Figure 3:
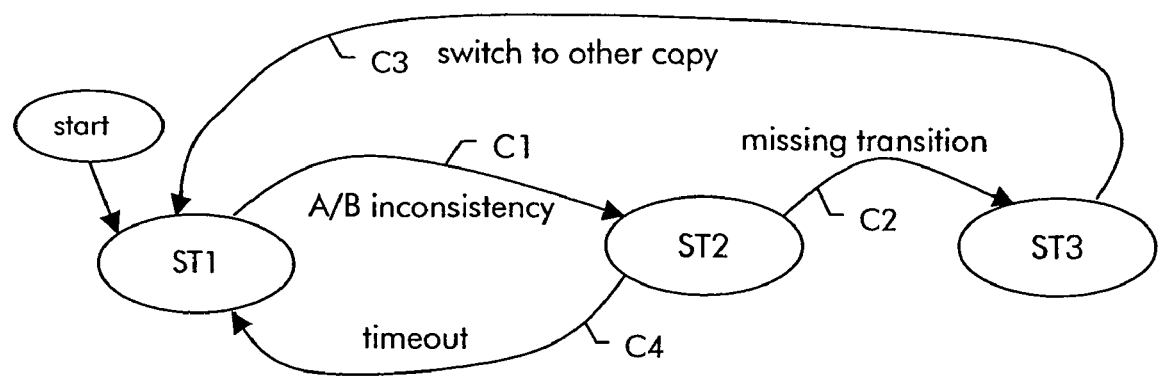
FIG. 3 shows a state diagram for the selector according to the invention.

FIG. 3 shows a state diagram of this third embodiment. After the start of the system, it is in a monitoring state ST1. If the monitor detects as condition C1 an inconsistency between copies A and B data signals, the second state ST2 is reached after M bits. In the state ST2, the system is loaded to switch immediately to that signal copy which shows the first bit transition (i.e., second condition C2). Switch over is shown as signal state ST3. After switch-over, the system goes back to the state ST1 again (condition C3). If not switch-over occurs for a predefined time interval (i.e., condition C4), the system goes back to the state ST1, as well. The timeout period may be selected according to known signal characteristics, e.g. the expected bit transitions associated with the frame alignment word, or according to signal statistics, e.g., the largest possible number of CID (Consecutive Identical Digits) to be supported.

While the selection mechanism has been described with respect to equipment protection switching, it should be noted that it is equally applicable to other type of protection, i.e., path protection or section protection.

The circuit according to this third embodiment is shown in FIG. 4. It contains all circuit components from FIG. 1 and in addition contains a timer TMR.

What is claimed is:

1. A network element comprising:
   first and second redundant signal paths carrying first and second redundant signals, respectively;
   a first and second selectors for selecting either of the two redundant signals as active;
   first and second transition monitors coupled to the first and second signal paths, respectively; and
   first and second frame monitors for monitoring said first and second signals, respectively, for the presence of a predefined bit pattern,
   wherein said first selector is controlled by the transition monitors and said second selector is controlled by the frame monitors,
   wherein said transition monitors monitor said first and second signals for bit level transitions; and in that said first selector is controlled by the transition monitors to alter selection in the event that the selected signal does not contain bit level transitions while the non-selected signal does, and
   wherein said signals appear to be valid if said predefined bit pattern is detected and wherein changing selection from the currently selected signal to the other signal according to detection of bit level transition is enabled only, if both signal copies appear to be valid.

2. A network element according to claim 1, comprising first and second delay elements of substantially N bit depth coupled to said first and second signal paths, respectively, wherein said selector is controlled to alter selection when the selected signal does not contain bit level transitions for a bit sequence of N bits while the non-selected signal does contains bit level transitions in the same interval.

3. A network element according to claim 1, further comprising a timer, wherein switch-over from one to the other signal according to detection of bit level transition is enabled only if after lapse of said timer the condition persists that the selected signal does not contain bit level transitions.

4. A network element according to claim 1, further comprising pull-up or pull-down circuits for pulling a failed signal to a predefined level.

5. A selection circuit adapted to be used in a network element comprising first and second redundant signal paths carrying first and second redundant signals, respectively, said circuit comprising:
   a first and second selectors for selecting either of the two redundant signals as active;
   first and second transition monitors adapted to be coupled to the first and second signal paths, respectively; and
   first and second frame monitors for monitoring said first and second signals, respectively, for the presence of a predefined bit pattern,
   wherein said first selector is controlled by the transition monitors and said second selector is controlled by the frame monitors,
   wherein said transition monitors monitor said first and second signals for bit level transitions; and in that said first selector is controlled by the transition monitors to alter selection in the event that the selected signal does not contain bit level transitions while the non-selected signal does, and
   wherein said signals appear to be valid if said predefined bit pattern is detected and wherein changing selection from the currently selected signal to the other signal according to detection of bit level transition is enabled only, if both signal copies appear to be valid.

6. A method of controlling selection of either of first and second signals from first and second redundant signal paths in a network element, said method comprising:
   selecting either of the first and second redundant signals as active signal;
   monitoring said first and second signals for the presence of a pre-defined bit pattern;
   monitoring said first and second signals for bit level transitions;
   altering selection in the case that the predetermined bit pattern is detected in the first and second signals and the selected signal does not contain bit level transitions while the non-selected signal does; and
   altering selection in the case that the predetermined bit pattern is not detected in the selected signal and the predetermined bit pattern is detected in the non-selected signal.

* * * * *